United States Patent [19]
Park et al.

[11] Patent Number: 5,866,053
[45] Date of Patent: Feb. 2, 1999

[54] METHOD FOR PROVIDING CONTINUOUS PROCESSING OF MICROCELLULAR AND SUPERMICROCELLULAR FOAMED MATERIALS

[75] Inventors: Chul B. Park, Mississauga, Canada; Nam P. Suh, Sudbury; Daniel F. Baldwin, Medford, both of Mass.

[73] Assignee: Massachusetts Institute of Technology, Cambridge, Mass.

[21] Appl. No.: 782,955

[22] Filed: Jan. 13, 1997

Related U.S. Application Data

[63] Continuation of Ser. No. 147,789, Nov. 4, 1993, abandoned.

[51] Int. Cl.$^6$ .................................................... B29C 44/20
[52] U.S. Cl. ................................ 264/50; 264/51; 264/53; 264/68
[58] Field of Search ................................ 264/50, 51, 53, 264/68

[56] References Cited

U.S. PATENT DOCUMENTS

| | | |
|---|---|---|
| 3,184,419 | 5/1965 | Merriman . |
| 3,227,664 | 1/1966 | Blades et al. . |
| 3,227,784 | 1/1966 | Blades et al. . |
| 3,637,458 | 1/1972 | Parrish ........................ 161/160 |
| 3,663,668 | 5/1972 | Fairbanks ..................... 264/50 |
| 3,730,916 | 5/1973 | Etchells ..................... 260/2.5 N |
| 3,787,543 | 1/1974 | Parrish ........................ 264/53 |
| 3,796,779 | 3/1974 | Greenberg ................... 264/50 |

(List continued on next page.)

FOREIGN PATENT DOCUMENTS

| | | |
|---|---|---|
| 0376064 A2 | 4/1990 | European Pat. Off. . |
| 47-49825 | 12/1972 | Japan ............................ 264/53 |
| WO 90/07546 | 7/1990 | WIPO . |

OTHER PUBLICATIONS

LeMay J.D., et al., "Low Density Microcellular Materials", *MTS Bulletin*, Dec. 1990, pp. 19–45.

Duril, P.L. et al., "Diffusion and Solution of Gases Into Thermally Softened or Molten Polymers", Part II., *AIChE Journal*, vol. 15, pp. 106–110, Jan., 1969.

Kreyelen, D.W., "Permeation of Polymer, the Diffusive Transport of Gases, Vapors and Liquids in Polymers", pp. 403–425, 1976.

Park, C.B. et al., "Cell Nucleation By Rapid Pressure Drop in Continuous Processing of Microcellular Plastics", *Use of Plastics and Plastic Composites: Materials and Mechanics Issues*, MD–vol. 46, pp. 537–552, ASME 1993.

Park, C.B., The Role of Polymer/Gas Solutions in Continuous Processing of Microcellular Polymers:, Ph.D. Thesis, MIT, Aug. 10, 1993 (cataloged Oct. 15, 1993).

Kolossow, K.D., "Extrusion of Foamed Intermediate Products With Single–Screw Extruders", *Plastic Extrusion Technology*, pp. 441–449, 1988.

*Primary Examiner*—Allan R. Kuhns
*Attorney, Agent, or Firm*—Ernest V. Linek; Dike, Bronstein, Roberts & Cushman, LLP

[57] ABSTRACT

An extrusion system for providing a foamed material in which a material such as a polymer material is supplied to an extruder for movement through a rotating screw member. The material is placed in a molten state and a foaming agent, such as a supercritical fluid, is introduced into the extruder at a selected pressure so that a two-phase mixture of the molten material and the foaming agent is formed. The foaming agent is then diffused into and dissolved in the molten material to form a single-phase solution which is forwarded from a solution formation to a nucleation device. A thermodynamic instability is induced through a rapid pressure drop, e.g., higher than 0.9 GPa/s in the nucleation device to nucleate microcells in the solution. A further shaping device, e.g., a die, can be used to produce a foamed material of a desired shape.

27 Claims, 7 Drawing Sheets

U.S. PATENT DOCUMENTS

| | | | |
|---|---|---|---|
| 3,812,225 | 5/1974 | Hosoda et al. | 264/54 |
| 3,882,209 | 5/1975 | Yanagisawa et al. | 264/45.9 |
| 4,155,969 | 5/1979 | Hendry | 264/45.1 |
| 4,211,523 | 7/1980 | Hunerberg | 425/4 C |
| 4,255,371 | 3/1981 | Shimoyashiki et al. | 264/54 |
| 4,390,332 | 6/1983 | Hendry | 425/4 R |
| 4,424,287 | 1/1984 | Johnson et al. | 521/74 |
| 4,454,087 | 6/1984 | Hayashi et al. | |
| 4,455,272 | 6/1984 | Schubert et al. | 264/53 |
| 4,473,665 | 9/1984 | Martini-Vvedensky et al. | 521/79 |
| 4,548,775 | 10/1985 | Hayashi et al. | |
| 4,719,246 | 1/1988 | Murdock et al. | 521/134 |
| 4,728,559 | 3/1988 | Hardenbrook et al. | 428/59 |
| 4,746,477 | 5/1988 | Wecker et al. | 264/45.5 |
| 4,761,256 | 8/1988 | Hardenbrook et al. | 264/45.5 |
| 4,832,881 | 5/1989 | Arnold, Jr. et al. | 264/29.7 |
| 4,873,218 | 10/1989 | Pekala | 502/418 |
| 4,906,672 | 3/1990 | Stone et al. | 520/130 |
| 4,990,542 | 2/1991 | Motani et al. | 521/79 |
| 5,034,171 | 7/1991 | Kiczek et al. | 264/51 |
| 5,049,328 | 9/1991 | Meyer et al. | 264/50 |
| 5,064,587 | 11/1991 | Meyke et al. | 264/50 |
| 5,064,874 | 11/1991 | Motani et al. | 521/146 |
| 5,082,608 | 1/1992 | Karabedian et al. | 264/46.1 |
| 5,120,559 | 6/1992 | Rizvi et al. | 426/446 |
| 5,133,913 | 7/1992 | Miyakawa et al. | 264/50 |
| 5,158,986 | 10/1992 | Cha . | |
| 5,160,674 | 11/1992 | Colton et al. . | |
| 5,358,675 | 10/1994 | Campbell et al. | 264/50 |
| 5,670,102 | 9/1997 | Perman et al. | 264/50 |

METHOD FOR PROVIDING CONTINUOUS PROCESSING OF MICROCELLULAR AND SUPERMICROCELLULAR FOAMED MATERIALS

This a continuation of application Ser. No. 08/147,789 filed on Nov. 4, 1993, now abandoned.

STATEMENT OF GOVERNMENT SUPPORT

This invention was made with government support under Grant Number CTS-9114738 awarded by the National Science Foundation. The government has certain rights in the invention.

INTRODUCTION

This invention relates generally to the processing of microcellular and supermicrocellular foamed materials, such as polymer plastic materials, and more particularly to the synthesis of gas/polymer solutions and the initiation of microvoid nucleation therein and the foaming thereof for the production of microcellular or supermicrocellular foamed plastic materials in extrusion processes.

BACKGROUND OF THE INVENTION

Conventional foamed products have been produced using either chemical or physical blowing agents. For example, various chemical blowing agents which are generally low molecular weight organic compounds are mixed into a polymer matrix and decompose when heated to a critical temperature, resulting in the release of a gas (or gases) such as nitrogen, carbon dioxide, or carbon monoxide. Techniques using physical agents include the introduction of a gas as a component of a polymer charge or the introduction of gases under pressure into molten polymer. Such standard foaming processes produce voids or cells within the plastic materials which are relatively large, i.e., on the order of 100 microns, or larger, with the percent of void fraction ranging from 20%–40%, e.g., for structural foams, or 80%–90%, e.g., for insulation foams, of the original material. The number of voids produced per unit volume of polymers is relatively low (on the order of $10^6$ cells/cm$^3$), and there are generally non-uniform cell size distributions throughout the foamed materials.

Extrusion of large cell polymer foam material can be accomplished using a technique known as the Celuka process that incorporates two sequential extruders. A dry mixture of polymer pellets and a nucleating agent are fed into the first extruder. After the mixture has been melted in the first extruder's compression or transition zone, a high pressure physical blowing agent (typically a fluro- or hydrocarbon gas or fluid) is injected through the barrel of the extruder into the polymer melt. Immediately following such injection, the melt is intensely mixed in the metering zone of the first extruder. The mixture next flows into the second extruder which provides further mixing and meters the flow. At the exit of the extruder is a die (typically an annular or a sheet profile type) which performs the primary shaping of the extrudate. The die is typically constructed such that pressure of the melt drops rapidly across the die lips. At the exit of the die, the expanding profile is surface cooled using a gas jet. As the profile expands, it is drawn over a mandrel or through a die to hold its shape.

A continuous microcellular polymer extrusion process has also been proposed e.g. in U.S. Pat. No. 4,728,559 issued to Hardenbrook et al. on Mar. 1, 1988. The Hardenbrook patent describes a process in which a web of plastic material is impregnated with an inert gas and the gas is diffused out of the web in a controlled manner. The web is reheated at a station external to the extruder to induce foaming, the temperature and duration of the foaming process being controlled to produce the desired cell characteristics. The process is designed to provide for the production of foamed plastic web materials with integral unmodified skins in a continuous manner. A significant limitation of this process is that only thin profiles (on the order of 0.020 inches in thickness) can be microcellular processed due to the limits of thermal cycling in producing thick walled profiles.

In another approach, the batch processing of microcellular plastics provides for pre-saturating a plastic material with a uniform concentration of a gas under pressure and the provision of a suddenly induced thermodynamic instability resulting in the nucleation of a large number of cells. For example, the material is pre-saturated with the gas and maintained under pressure and at a temperature above the glass transition temperature. The material is suddenly exposed to a low pressure to nucleate cells and promote cell growth to a desired size (depending on the final density required) thereby producing a foamed material having microcells. The material is then quickly quenched to maintain the microcellular structure. Such a technique for microcellular materials has been described in U.S. Pat. No. 4,473,665, issued to Martini-Vredensky et al. on Sep. 25, 1984.

Improved techniques have been described in U.S. Pat. No. 5,158,898 issued on Oct. 27, 1992 to Cha et al. A supercritical fluid instead of a gas, is introduced as a foaming agent so as to increase the number of cells nucleated per unit volume of the original material and to produce much smaller cell sizes than those in standard commercial polymer foams. The supermicrocellular process described tends to provide cell sizes that are generally smaller than the flaws that preexist in the polymers so that the densities and the mechanical properties of the materials involved can be controlled without sacrificing the mechanical properties of many polymers.

Microcellular plastics are generally defined as foamed plastics characterized by cell sizes on the order of 10 $\mu$m, cell densities on the order of $10^9$ cells per cubic centimeter, and specific density reductions in the range of 5 to 95 percent. These cells are smaller than the flaws preexisting within the polymers and, thus, do not compromise the polymers, specific mechanical properties. The result is a lower density material with no decrease in specific strength and a significant increase in the toughness compared to the original polymers. With microcellular plastics, one can use less polymer, thereby substantially reducing material costs while maintaining mechanical properties.

In order to reduce the cell size and to increase the cell density, the above discussed supermicrocellular process was developed for manufacturing foamed plastics having cell sizes of 0.1 to 1.0 micron and cell densities from $10^{12}$ to $10^{15}$ cells per cubic centimeter of the original material, as described in the aforementioned Cha et al. patent. The improved technique provides for saturating a polymer plastic material with a supercritical fluid such as carbon dioxide, which has a higher solubility in the polymers for its supercritical fluid state than for its comparable gaseous state. When the fluid/polymer solution contains a sufficient amount of supercritical fluid at a suitably selected temperature and pressure, the temperature and/or pressure of the fluid/polymer system is rapidly changed to induce a thermodynamic instability and a foamed polymer is produced.

The resulting foamed material can achieve a cell density of several hundred trillion voids per cubic centimeter and average void or cell sizes of less than 1.0 micron.

The latter two batch foaming techniques described involve a relatively slow gas-saturating process due to slow gas diffusion. It is desirable to develop an effective technique for saturating polymers with a large amount of gas or supercritical fluid in real time so that the overall cycle time for microcellular processing is significantly reduced and so that microcellular and supermicrocellular plastics can be produced continuously. Furthermore, it is desirable to develop an effective foaming technique so as to produce the desired cell densities in such continuous processes and to do so at a reasonable cost.

BRIEF SUMMARY OF THE INVENTION

A particular embodiment of an extrusion process of the invention used to produce a supermicrocellular material, for example, comprises three stages, namely, the formation of a polymer/supercritical fluid mixture, the completion of a single-phase polymer/supercritical fluid solution formation, and the inducement of a thermodynamic instability to produce a nucleation and expansion of the solution to provide a foamed material having a large number of micro-voids or cells. While specifically described below with respect to supermicrocellular materials using supercritical fluids, the techniques used herein can be used to obtain microcellular materials using gases rather than supercritical fluids.

In accordance with the invention, polymer/supercritical fluid solutions are produced continuously by injecting a metered amount of a supercritical fluid, such as carbon dioxide or nitrogen, into a stream of molten polymer in an extrusion barrel. The amount of supercritical fluid delivered is preferably metered either by using a positive displacement pump for introducing the supercritical fluid or by varying the injection pressure of the supercritical fluid as it passes through a porous material which acts to resist the fluid flow. The metered supercritical fluid is then delivered to the extrusion barrel where the supercritical fluid is mixed with the molten polymer flowing therein to form a two-phase polymer/supercritical fluid mixture.

The supercritical fluid in the mixture then diffuses into the polymer melt so as to complete the formation of a uniform, single-phase solution of polymer and supercritical fluid. Preferably, the weight ratio of supercritical fluid to polymer should typically be about 10%, or greater. The maximum soluble amount of a supercritical fluid in a polymer depends on the working pressure and temperature of the barrel. Using high pressures and/or lower processing temperatures increases the maximum soluble amount of supercritical fluid in the polymer. Therefore, higher pressures and/or lower temperatures are preferable to promote large soluble gas amounts, weight ratios, and nucleation cell densities.

When the polymer/fluid system, containing a sufficient amount of supercritical fluid, becomes a uniform and homogeneous single-phase solution, the pressure is rapidly lowered to induce a thermodynamic instability so as to promote a high rate of bubble nucleation in the solution. Typical pressure-drop rates used in the invention are above 0.9 GPa/s. One distinguishing feature of the invention is that previous extrusion systems for producing foamed parts have not used such high pressure-drop rates. The nucleated polymer/supercritical fluid solution in the invention can be supplied simultaneously or subsequently to a shaping system such as a die at a selected pressure to produce expansion and foaming of the solution. In order to prevent the final cell shape from being distorted, the nucleated polymer/supercritical fluid solution can be pressurized within the die until the shaping process has been completed.

By using such a technique, a continuous stream of super-microcellular (or microcellular) polymers is produced. The invention can be used for processing many materials, e.g., polymers, including but not limited to an amorphous and/or semicrystalline polymers, that can absorb a gas or a supercritical fluid. Moreover, any gas or supercritical fluid can be used if it is sufficiently soluble in the polymer that is being processed.

BRIEF DESCRIPTION OF THE DRAWINGS

The invention can be described with the help of the accompanying drawings wherein.

DETAILED DESCRIPTION OF THE INVENTION

Figure 1:
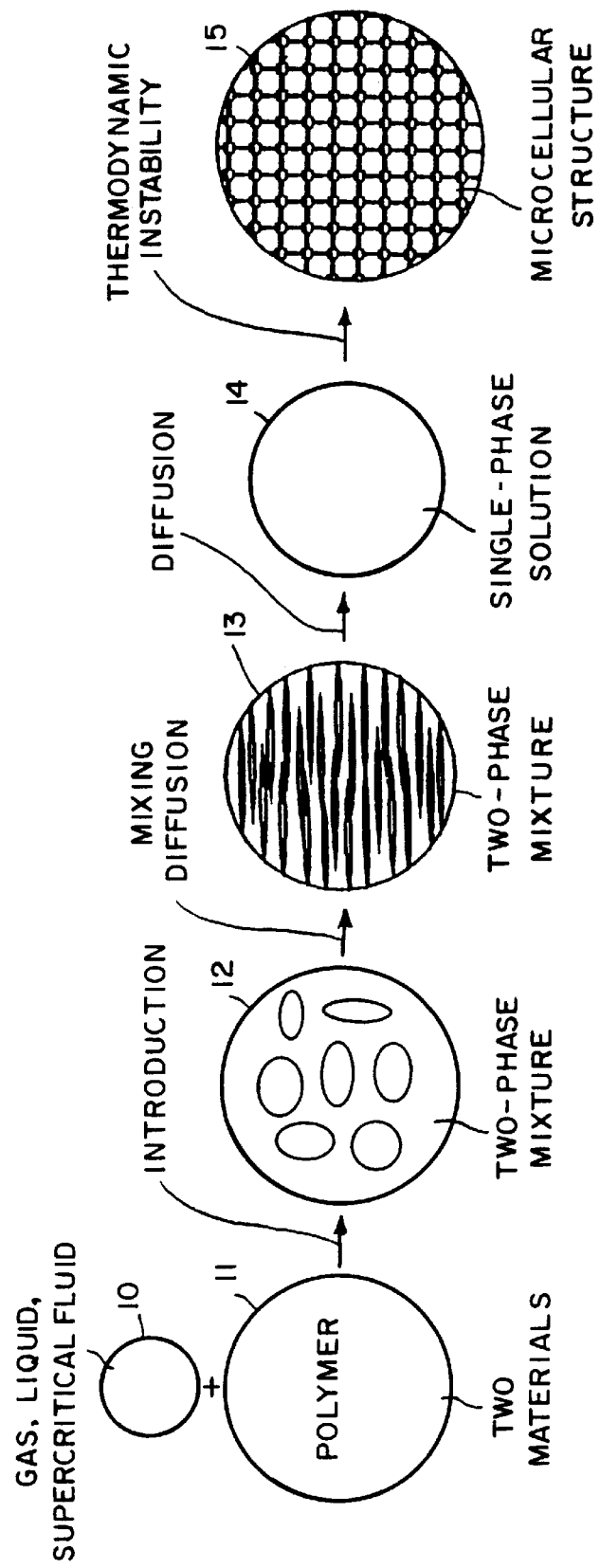
FIG. 1 shows a general diagrammatic view of various processing steps that can occur in an exemplary process of the invention.

FIG. 1 shows diagrammatically and in a general way the morphological changes of a foaming agent and a polymer material that occur in a particular embodiment of the process of the invention. Initially, a foaming agent 10, which can be a gas or a supercritical fluid, and a polymer 11 are separate materials. A metered amount of foaming agent 10 is then introduced into a molten stream of polymer to form a two-phase polymer/agent mixture 12 having a substantially constant weight ratio of the materials. The injected agent bubbles are broken into smaller bubbles and subsequently stretched or elongated during a further during a further mixing process to form a desired two-phase mixture 13 in which the agent may be partially diffused in the mixture, for example. The agent is then more fully diffused into the polymer matrix, forming a single-phase solution 14 thereof. Alternatively, all of the diffusion of the agent into the polymer can occur after the mixing stage or all of the diffusion can occur during the mixing stage in which case no further diffusion is needed. A thermodynamic instability is then induced in the polymer/agent solution to promote microcellular nucleation to form a microcellular structure 15. The formation of the polymer/agent mixture, the completion of the single-phase solution formation, and the microcellular nucleation are three critical steps for the manufacture of such microcellular (and/or supermicrocellular) polymers. Such steps are integrated into a continuous extrusion process so that the required functions described in the overall process are satisfied, as discussed in more detail below.

Figure 2:
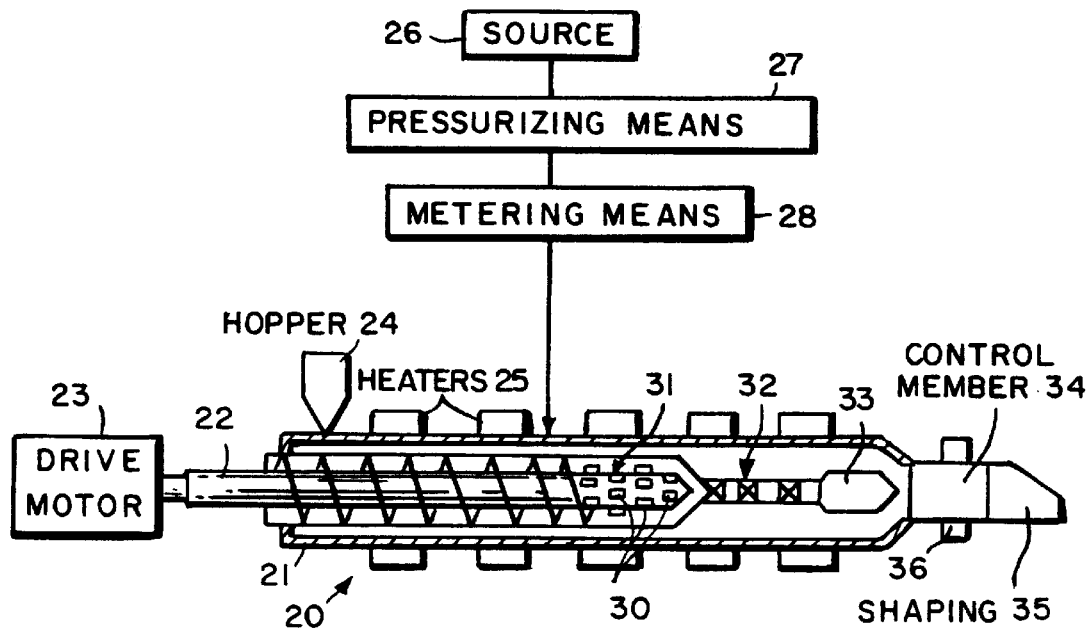
FIG. 2 shows a diagrammatic view of an exemplary embodiment in accordance with the invention.

FIG. 2 shows a more specific diagrammatic view of a particular embodiment of an extrusion system for implementing the above discussed process of FIG. 1 using a supercritical $CO_2$ fluid, for example. As seen therein, an extruder 20 includes an extruder barrel 21 having a rotating screw member 22 suitably mounted therein, the rotation thereof being produced by an appropriate drive motor 23. A plurality of pellets of a material to be foamed, e.g. a polymer plastic material, are introduced into the extruder barrel 21 via a hopper 24. Extruder barrel 21 has a plurality of barrel heaters 25 mounted thereon to heat the barrel. Hence, the polymer pellets are heated therein to a molten state both by friction due to the mechanical shear forces on the material produced by the rotating screw member 22 and by the heated barrel as the pellets are carried through the barrel by screw member 22.

A supercritical fluid, such as $CO_2$ from a source 26 thereof is pressurized to a selected pressure, by a suitable pressurizing means 27, and a metered amount thereof is supplied at a controlled rate via a metering means 28 to the extruder barrel 21. This results in the formation of a suitable two-phase mixture, at a high pressure, which mixture is formed in the polymer melt within the extruder barrel 21. The location of the supercritical fluid injection can be suitable selected to occur at a location along the barrel such that a suitable minimum, but relatively high, pressure can be maintained throughout the remaining stages of the process.

In the particular embodiment described, the two-phase mixture of supercritical fluid and polymer material that results is then further mixed by shear forces thereon using a plurality of irregular blades 30 mounted on a portion 31 of extruder screw 22 within extrusion barrel 21. Alternatively, in some applications, the mixing process which occurs when using a standard extrusion screw can be sufficient to provide the desired mixture without the need for the irregular blades 30. The dynamically mixed mixture is then supplied to a plurality of static mixers 32 where the mixture is further mixed and the supercritical fluid diffuses and dissolves into the polymer material so as to form a single-phase solution thereof. In some embodiments, passage of the mixture through a barrel which does not use the static mixers can provide sufficient diffusion and dissolution to form the desired single-phase solution. The single-phase solution is supplied via an extruder output member 33 to a pressure control member 34 at a selected temperature which is maintained by appropriate temperature control elements 36. The pressure drops rapidly in the pressure control member 34 to produce both supermicrocellular nucleation and a full or limited expansion of said nucleated supermicrocells to continuously provide a nucleated solution. A further shaping means 35, e.g., a die, can be used to produce a foamed material of a desired shape, e.g., a sheet, a filament, etc. During the shaping process and/or subsequent thereto, where limited expansion has previously occurred, the material will then become fully expanded.

While the system shown in FIG. 2 is similar to a system shown in the afore-mentioned Cha et al. patent, it is noted that in contrast thereto, the material is not heated after the diffusion process so that no nucleation occurs therein, as occurs in the Cha et al. patent, and both nucleation and cell growth or expansion occurs following the diffusion process by a rapid drop in pressure of the solution. Moreover, as discussed in more detail below, certain improved techniques, not discussed by Cha et al., for supplying a gas or a supercritical fluid to the molten material and for producing the desired pressure drop have been developed in accordance with the invention.

In order to produce a two-phase polymer/agent fluid mixture 12 having a substantially constant weight ratio, the flow rates of the agent, e.g., a supercritical fluid, and the polymer streams introduced in extrusion barrel 21 need to be controlled. The polymer flow rate is easily controlled by controlling the rotational speed of the extruder screw 22. An optional technique for metering the polymer flow would be to use a standard polymer gear pump inserted in the flow field upstream of the pressure control member 34. The metering of the flow of a foaming agent such as a supercritical fluid, for example, is more difficult because the flow rate is very small, the working pressure is very high, and the viscosity of a supercritical fluid is very low.

To achieve the desired flow rates, the solubility of the foaming agent in the polymer melt is estimated at the processing pressure and temperature used at such stage. Only a soluble amount of foaming agent need be injected into the polymer melt stream, since an excessive amount thereof would result in the formation of undesirable voids in the polymer melt. The existence of such voids prevents homogeneous nucleation at a later stage because the foaming agent molecules prefer to diffuse to larger cells, which results in the formation of hollow cavities in the final product. In general, the solubility of a foaming agent such as a supercritical fluid in a polymer changes with the temperature and pressure. For example, at 200° C. and 27.6 MPa (4,000 psi), which represent a typical processing temperature and pressure, the solubility of $CO_2$ in most polymers is approximately 10% by weight, while that of nitrogen under the same conditions is about 2% by weight.

Figure 3:
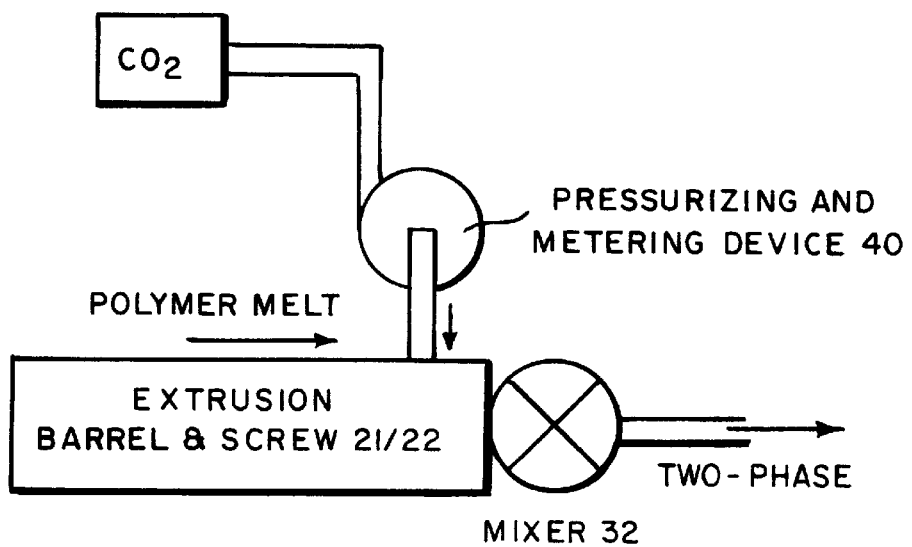
FIG. 3 shows a block diagram of an exemplary technique of the invention for supplying a supercritical fluid to an extruder.

One way of controlling the flow rate of a supercritical fluid, for example, is by using a positive displacement pump/compressor element. FIG. 3 depicts diagrammatically a processing and metering device 40, which can be a positive displacement pump, for example, which is used to produce a metered amount at high pressure of gas or supercritical fluid, e.g. $N_2$ or $CO_2$. A characteristic of positive displacement pumps is that the output is unaffected by variations of system pressure because a positive internal seal against leakage is present therein. The volumetric output is completely controlled by the pump, thereby allowing the flow rate of the supercritical fluid to be controlled independently of the pressure of the extrusion barrel.

Figure 4:
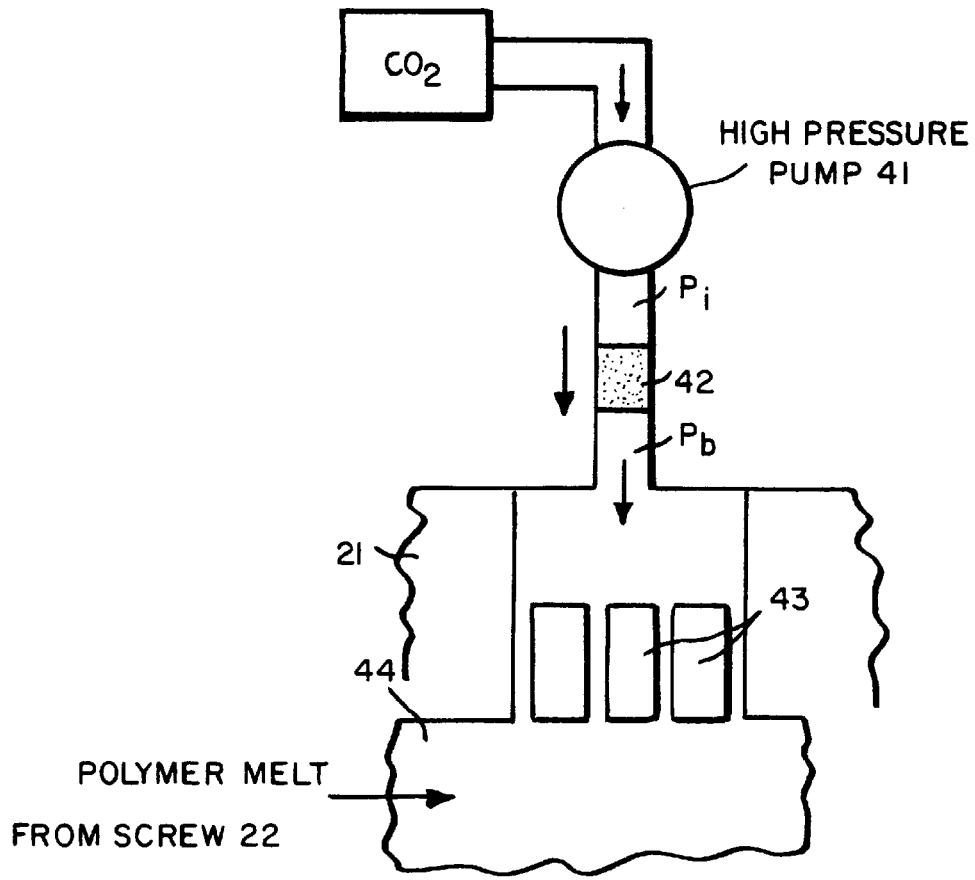
FIG. 4 shows a diagrammatic view of an alternative exemplary technique of the invention for supplying a supercritical fluid to an extruder.

Another technique as shown in FIG. 4 for controlling the flow rate of the supercritical fluid is to use a porous material that is highly resistant to the flow of the supercritical fluid. A supercritical fluid, for example, is supplied to a high pressure pump 41 which supplies the fluid at an input pressure $P_i$ through a porous material 42 and, thence, through injection ports 43 into the polymer melt at the screw 22 in barrel 21. The difference between the input, or upstream, and the output, or downstream, pressures $P_i$ and $P_b$, respectively, at the porous material is the driving force for the flow of the supercritical fluid. Since the flow rate of the supercritical fluid through the porous material is roughly proportional to the difference between the input pressure $P_i$ and the output pressure at the barrel $P_b$, the flow rate can be controlled by varying the input pressure for the given barrel pressure, the latter being governed by the local polymer melt pressure and influenced by the screw speed. The fluid can be injected into the polymer melt 44 via a plurality of injection ports 43. The flow rate of the supercritical fluid through the porous material can be calibrated for a range of upstream pressures and down stream pressures. When the flow rate of the polymer melt is selected, the injection pressure $P_i$ of the supercritical fluid can be adjusted to maintain a desired supercritical fluid to polymer weight ratio.

The next critical step in the continuous production of supermicrocellular plastics is the completion of the polymer/supercritical fluid solution at a reasonable rate. Formation of a homogeneous single-phase solution from a two-phase mixture of polymer and supercritical fluid is governed by the diffusion of the supercritical fluid into the polymer. Diffusion of gas molecules in polymers is known to be very slow. For example, the diffusion coefficient of $CO_2$ in most thermoplastics at room temperature is approximately $5 \times 10^{-8}$ $cm^2/s$. The time required for a supercritical fluid to diffuse through a distance of 0.5 mm is estimated as 14 hours which means that it takes approximately 14 hours to saturate a 1 mm thick sheet of polymer plastic with a supercritical fluid in batch processes at room temperature. In order to produce supermicrocellular plastics at industrial processing rates, a technique for the rapid formation of a polymer/supercritical fluid solution has been devised as part of this invention. There are at least two basic strategies for rapid solution formation. One is to increase the diffusion coefficient by increasing the temperature and the other is to reduce the diffusion distance through a process referred to as convective diffusion.

Since the diffusion coefficient increases as the temperature increases, the rate of supercritical fluid diffusion is enhanced by processing the two-phase polymer/supercritical fluid mixture at elevated temperatures, for example, in the heated extrusion barrel. The diffusion coefficients of supercritical fluids in polymers at high temperatures can be measured for a particular system or can be estimated using known data. For example, at 200° C., a typical diffusion coefficient of $CO_2$ in a thermoplastic is approximately $10^{-6}$ $cm^2/s$, which is two orders of magnitude greater than a typical diffusion coefficient, $10^{-8}$ $cm^2/s$, at room temperature (e.g. between 20° C.–25° C.).

The diffusion rate can also be enhanced by convective diffusion. As the polymer melt and the supercritical fluid are mixed, more polymer melt is brought into contact with the supercritical fluid which increases the effect of convective diffusion. This convective diffusion effect is enhanced through an increase in the interfacial area per unit volume, a reduction of the diffusion distance, and a redistribution of the local supercritical fluid concentration profile in the polymer matrix. One technique for rapid solution formation using convective diffusion employs laminar mixing in the molten polymer shear field. The shearing action of the extrusion screw draws small bubbles of supercritical fluid into the molten polymer shear field. The mixing action of the shear field disperses the supercritical fluid bubbles into the polymer matrix. The supercritical fluid, eventually, diffuses into the polymer, forming a single-phase solution. Since the diffusion rate strongly depends on the mixing behavior, the diffusion time can be controlled by varying the degree of mixing. At typical industrial processing rates, the mixing of the polymer and supercritical fluid must result in striation thicknesses such that the supercritical fluid will diffuse into the polymer melt within a reasonable length of time. The mixing accomplished by the simple screw motion is limited, although in some cases it is adequate. However, the mixing effectiveness can be enhanced by introducing various mixing sections in the extruder. The operative concept of such mixing sections is to provide reorientations of the mixture during processing so as to enhance the effectiveness of shear mixing. Using such mixing sections, the diffusion time decreases due to the enhanced degree of mixing and the redaction of the striation thickness in the mixture.

Figure 5:
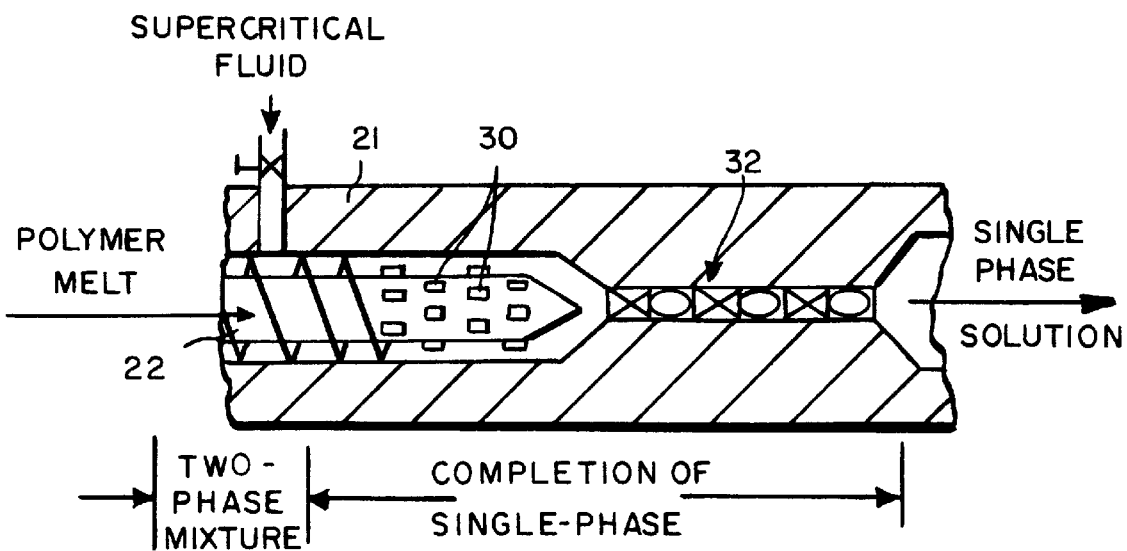
FIG. 5 shows a diagrammatic view of a convective diffusion technique used in an exemplary embodiment of the invention.

FIG. 5 shows one type of convective diffusion device employed in the invention. When metered amounts of polymer melt and supercritical fluid are supplied, the shear fields generated by the motion of screw 22, the irregular mixing blades 31 and the static mixers 32 are used to thoroughly mix the two-phase polymer/supercritical fluid mixture. The degree of mixing increases with time and the striation thickness of the polymer/supercritical fluid mixture decreases. Since diffusion also tends to occur at the same time as mixing, the volume fraction of the supercritical fluid in the mixture decreases as the mixing progresses. By the time it reaches the end of the static mixing section, the initial two-phase mixture has become a single-phase solution. An order of magnitude analysis predicts that in such a system the striation thickness of the polymer/supercritical fluid mixture in the device is approximately 90 $\mu$m and that the solution formation is completed in about 80 seconds. Accordingly, continuous solution formation can be achieved in extrusion systems without substantially decreasing the processing rates that must be used as compared to processing rates using conventional extrusion techniques. By achieving smaller striation thicknesses, it is possible to decrease the solution formation time and further increase processing rates.

The next critical stage is the promotion of large bubble nucleation rates in the polymer/supercritical fluid solution. Nucleation of bubbles can be defined as the transformation of small clusters of supercritical fluid molecules into energetically stable pockets of molecules with distinct walls. The microcellular process requires that the nuclei density be larger than $10^9$ cells/$cm^3$ so that the fully grown cell size will be less than 10 $\mu$m, while for supermicrocellular materials the nuclei density is between $10^{12}$–$10^{15}$ cells/$cm^3$, so the fully grown cell size lies between 0.1–1.0 $\mu$m. The key to producing the required cell density is to induce a very high rate of cell nucleation in the polymer/supercritical fluid solution. High nucleation rates for a supercritical fluid and polymer system have been achieved by using a thermodynamic instability. In order to make use of a thermodynamic instability in a continuous process, a rapid drop in supercritical fluid solubility must be induced in the polymer/supercritical fluid solution. The solubility of supercritical fluid in a polymer changes with pressure and temperature. Therefore, a thermodynamic instability can be induced by rapidly varying the pressure, temperature, or both. Since, in the typical range of interest, the solubility of a supercritical fluid in a polymer decreases as the pressure decreases, a high cell nucleation rate can be promoted by subjecting the polymer/supercritical fluid solution to a rapid pressure drop. According to the classical nucleation theory, the cell nucleation rate will increase for a larger pressure drop. If the pressure drops instantaneously, the greatest possible number of cells will be nucleated out of a given polymer/supercritical fluid solution. However, in reality the pressure must drop over a finite time period. The more rapidly the pressure drops, the greater the number of cells that will be nucleated, because a greater thermodynamic instability will be induced.

Figure 6:
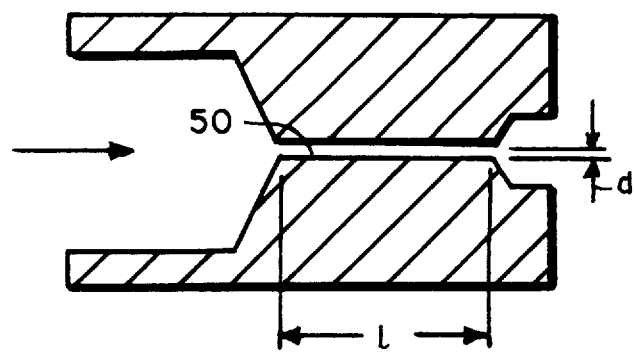
FIG. 6 shows a portion of an exemplary pressure drop nucleation device as used in the invention.

FIG. 6 shows a rapid pressure drop device which includes at least one long, narrow nozzle 50. When a viscous polymer/supercritical fluid solution passes from the extruder through the long, narrow nozzle, the pressure drops with distance due to friction. The design variables of such a decompressive nucleation device are the diameter and the length of the nozzle, as well as the number of nozzles that are used. It is desirable, for example, when using a single nozzle that the diameter and length be selected to provide a pressure drop greater than 0.9 GPa/s. In order to be able to induce the greatest pressure-drop rates, the geometry of the nozzle is configured based on the particular Theological properties of the polymer being processed. The solution passes through the nozzle at a nozzle pressure of 27.6 MPa (4,000 psi), the pressure drop rate achieved is about 5 GPa/s. This unusually rapid drop in supercritical fluid solubility induces a thermodynamic instability, and a high nucleation rate is promoted in the polymer/supercritical fluid solution.

Based on the above discussion, a particular experimental extrusion system that has been constructed can be described in accordance with FIG. 2. The system used a ¾ inch Brabender Type 2523 extruder 20 with a filamentary shaping means, or die, which means also provides for the desired pressure control. The barrel 21 was tapped near the end of the screw 22 and was connected to a high pressure $CO_2$ or $N_2$ cylinder. Mixing blades 31 and static mixers 32 were used for enhancing the mixing of the two-phase supercritical fluid and polymer melt. Both semicrystalline and amorphous polymers were processed, such as, for example, Phillips 66 Marlex Polypropylene (PP), Novacor/Monsanto 3350 High Impact Polystyrene (HIPS), and GE Cycolac Acrylonitrile Butadiene Styrene (ABS). Polymeric pellets were supplied to the hopper and melted in the barrel. A metered amount of supercritical CO2 or $N_2$ was injected into the polymer melt. Cross sections of extruded foam samples were examined with a scanning electron microscope.

Figure 7:
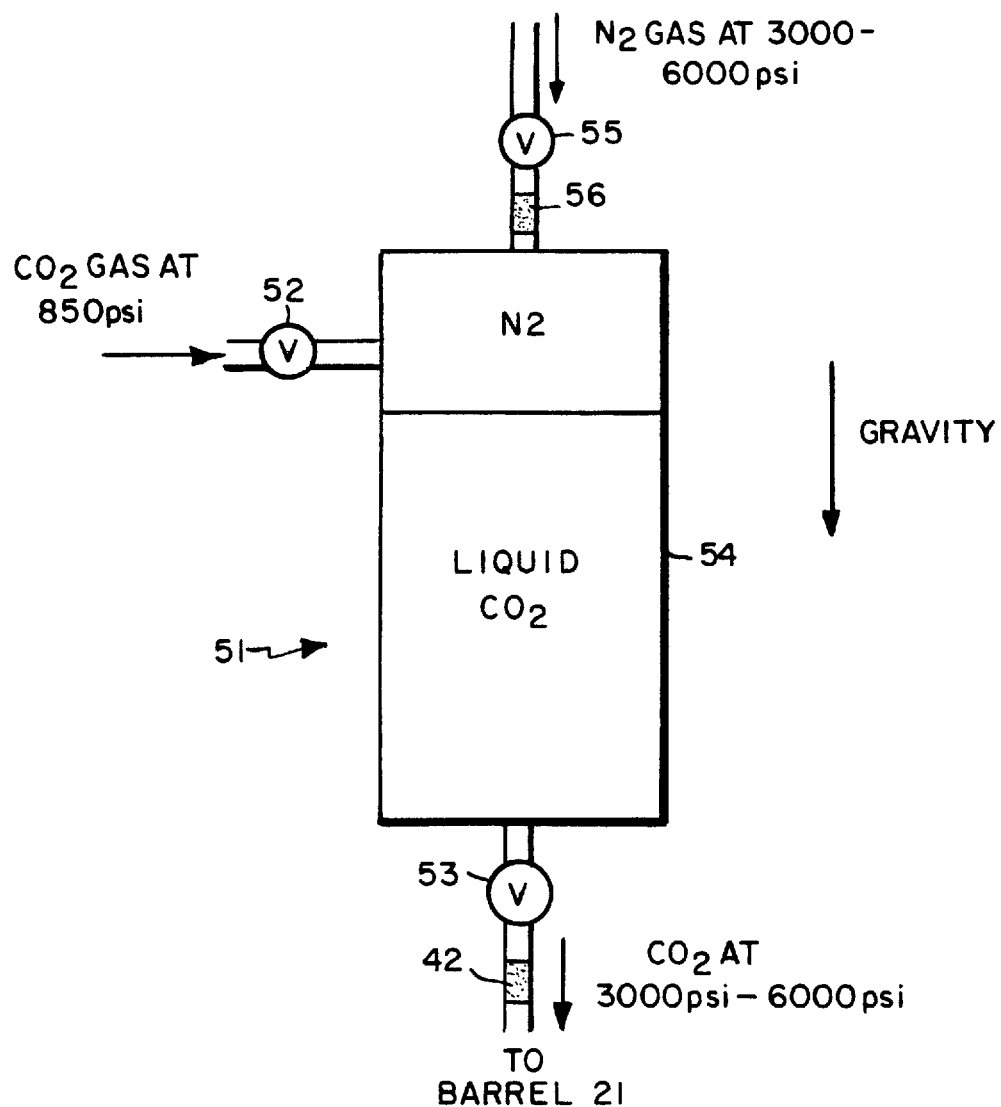
FIG. 7 shows a diagrammatic view of an exemplary high pressure pump for supplying a supercritical fluid using a nitrogen gas.
Figure 8:
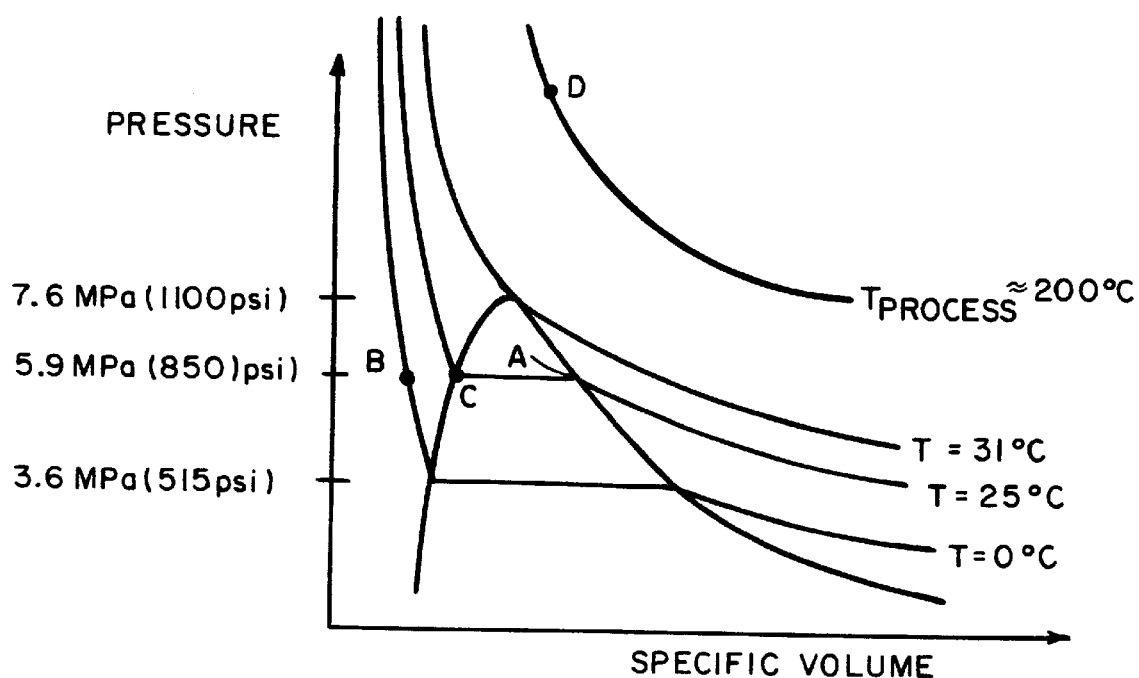
FIG. 8 shows a graph depicting a pressure vs. specific volume diagram using a $CO_2$ supercritical fluid.

To deliver the high pressure supercritical fluid, such as $CO_2$, to the extruder barrel, high pressure cylinders, a high pressure pump, and a porous material for metering were used. High pressure nitrogen can be obtained commercially and can be directly supplied to a metering device without the need for a high pressure pump or compressor. The flow rate of the supercritical fluid through the porous material was calibrated for a range of upstream pressures and downstream pressures. In order to inject a supercritical fluid at a desired rate into the extrusion barrel, the supercritical fluid should be supplied upstream under a selected high pressure, which should be higher than the barrel pressure Pb, where typically Pb=27.6 MPa (4,000 psi). Since carbon dioxide is commercially available only up to 5.9 MPa (850 psi) at room temperature, a high pressure pump 51 for supplying high pressure $CO_2$ was devised as shown by the example in FIG. 7. for producing high pressure $CO_2$. First, the pump is filled with gaseous $CO_2$ at 5.9 MPa (850 psi). The wall temperature of the pump is lowered to 0° C., e.g., using ice (not shown), while a $CO_2$ inlet valve 52 is opened. A nitrogen ($N_2$) inlet valve 55 and a pump outlet valve 53 (valve 3) are closed at this time. The $CO_2$ gas is liquified locally at the wall of the pump because the equilibrium phase of $CO_2$ at 5.9 MPa (850 psi) and 0° C. is liquid. Gravity causes the liquified $CO_2$ to collect at the bottom of the pump chamber 54. More $CO_2$ flows into the pump during the liquefaction of the $CO_2$. When the $CO_2$ is liquified at the wall, the specific volume of the $CO_2$ decreases and the pressure inside the pump tends to decrease. Since the pump is connected to a 5.9 MPa (850 psi) pressure source, the local liquefaction of $CO_2$ causes more $CO_2$ to flow into the pump in order to maintain the pressure. The states of $CO_2$ during this process can be seen in FIG. 8. Since the $CO_2$ gas cylinder provides saturated gas at 5.9 MPa (850 psi), the pump is filled with the saturated supercritical fluid at this pressure (as at state "A" in "FIG. 8"). Then some of the saturated supercritical fluid becomes locally liquified (as at state "C") at the wall because of the low wall temperature. The liquid $CO_2$ is cooled further to 0° C. in equilibrium with the pump wall and the pressure is 5.9 MPa (850 psi) . More $CO_2$ flows in to compensate for the specific volume difference until the entire volume of the pump is filled with the liquid at state "BE". When the entire volume in chamber 54 is filled with liquid $CO_2$ at 5.9 MPa (850 psi) , valve 52 is closed and valve 55 is opened. Then the liquified $CO_2$ is pressurized as high pressure $N_2$ gas flows into the chamber. The liquid $CO_2$ can be pressurized up to a desired pressure using a suitable pressure regulator (not shown) for the $N_2$ gas. This pressurized $CO_2$ is supplied from pump 51 for metering and for injection into the barrel. Although $N_2$ is in a supercritical phase, liquid $CO_2$ and supercritical $N_2$ are not mixed together unless there is a sudden flow of the $N_2$ into the $CO_2$ when valve 55 is opened. A flow restrictor 56 which consists of a porous material is placed next to the output of opening of valve 55 to prevent a sudden incoming flow of $N_2$. When the liquid $CO_2$ is pressurized as a separate liquid phase, diffusion of $N_2$ into the $CO_2$ liquid occurs at the phase boundary. However, contamination of the $CO_2$ bath by the $N_2$ molecule diffusion is substantially negligible. Liquid $CO_2$ is metered by a porous material 42 and thence injected into the extruder barrel. Liquid $CO_2$ reaches a supercritical state (as at State "D") and becomes a supercritical fluid when it is preheated as it flows into the metering device and subsequently is injected into the barrel at substantially the polymer melt temperature.

Figure 9:
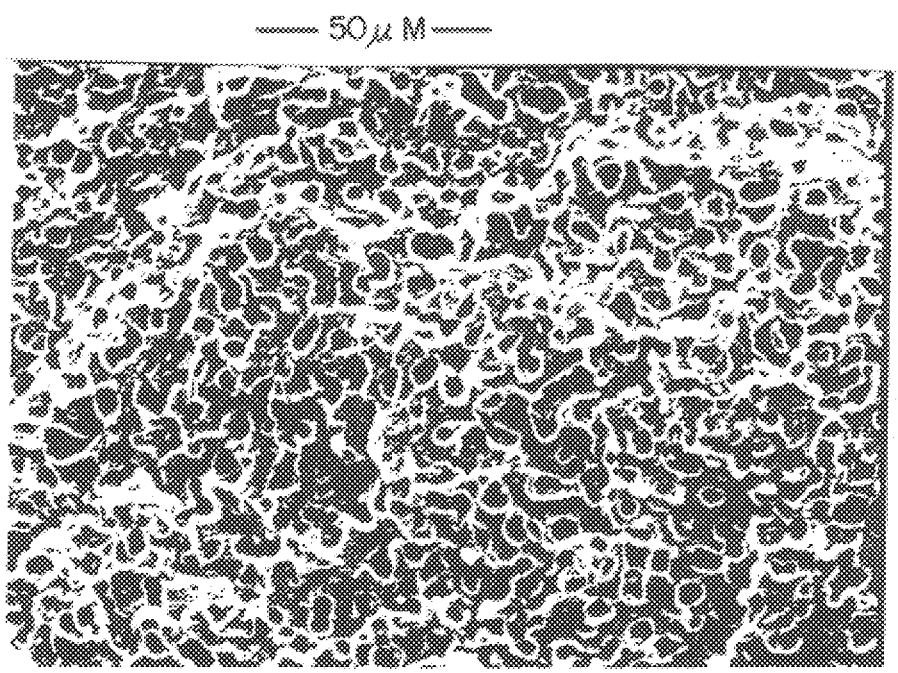
FIG. 9 shows a micrograph of a typical structure of a microcellular foam material produced in accordance with the invention using a supercritical fluid.

The effect of using different polymeric materials on the cell morphology has been investigated using a $CO_2$ supercritical fluid, approximately 10% by weight of $CO_2$ being injected into the polymer melt. When polypropylene (PP) was processed with $CO_2$, the cell density was $6 \times 10^8$ cells/cm3. When ABS was processed with $CO_2$, the cell density was $9 \times 10^8$ cells/cm$^3$. When HIPS was processed with $CO_2$, the cell density was $8 \times 10^9$ cells/cm3. Such high cell densities in samples processed with $CO_2$ appear to be due to a high solubility of $CO_2$ in the polymers. The solubility of $CO_2$ in most polymers at 27.6 MPa (4,000 psi) and 200° C. is estimated as 10% by weight. Because of such high solubility, a large amount of $CO_2$ supercritical fluid is dissolved in the polymer. It is believed that such large amount of dissolved supercritical fluid induced a very high thermodynamic instability, and thereby a high cell density. FIG. 9 shows a typical scanning electron micrograph of an extruded HIPS using a $CO_2$ injection.

Figure 10:
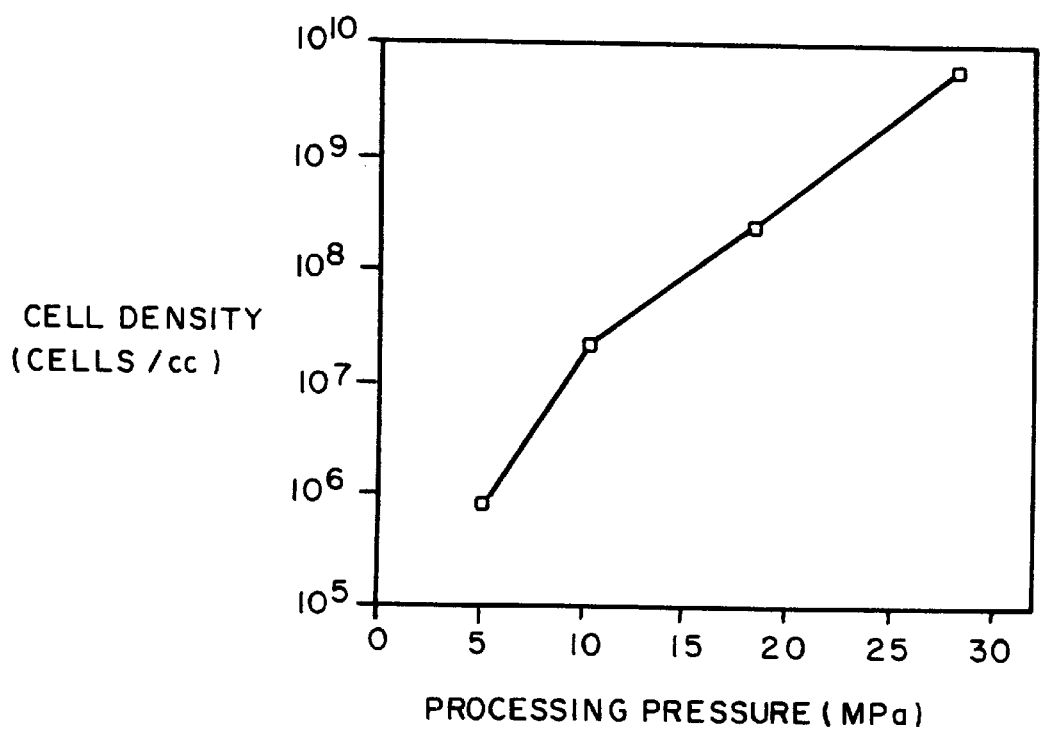
FIG. 10 shows a graph of the effect of processing pressure on the cell density of a exemplary extruded material in accordance with the invention.

The effect of the processing pressure on the cell morphology has been investigated. The maximum soluble amount of $CO_2$ was injected into the polymer melt at each processing pressure, using an HIPS polymer. When the processing pressures were 5.4 MPa (780 psi), 10.6 MPa (1,530 psi), 18.6 MPa (2,700 psi), and 28.3 MPa (4,100 psi), the cell densities were $7 \times 10^5$ cells/cm$^3$, $2 \times 10^7$ cells/cm$^3$, $2 \times 10^8$ cells/cm$^3$, and $6 \times 10^9$ cells/cm$^3$, respectively. These cell densities are plotted as a function of the processing pressure in FIG. 10. FIG. 10 predicts that a microcellular structure with a cell density larger than $10^9$ cells/cm$^3$ can be produced when using supercritical $CO_2$ and the processing pressure is higher than 22 MPa (3,200 psi). The required supercritical fluid amount for microcellular nucleation is estimated to be 7.5% by weight. It is noted that the solubility of $CO_2$ increases with an increase in processing pressure. Therefore, a higher cell density can be achieved by increasing the processing pressure to a pressure above 4000 psi, thereby providing more than 10% by weight of $CO_2$ dissolved in the polymer.

Figure 11:
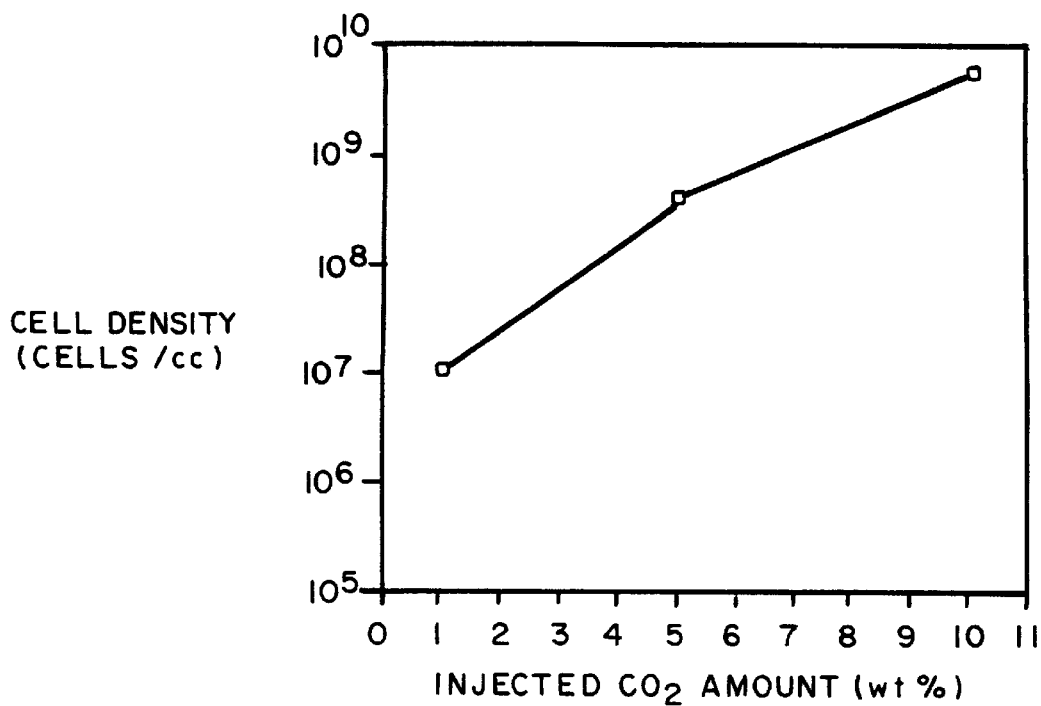
FIG. 11 shows a graph depicting the cell density of an extruded material as a function of the amount of injected $CO_2$ supercritical fluid in accordance with an embodiment of the invention of FIG. 3.

The effect of the injected amount of the supercritical fluid on the cell density was also investigated by varying the injected amount of the supercritical fluid while the processing pressure was maintained at 27.6 MPa (4,000 psi). When 1%, 5%, and 10% (by weight) $CO_2$ were injected, the cell densities were $10^7$ cells/cm$^3$, $4\times10^8$ cells/cm$^3$, and $6\times10^9$ cells/cm$^3$, respectively. These cell densities are plotted as a function of the injected supercritical fluid amount in FIG. 11. For a processing pressure of 27.6 MPa (4,000 psi), the 10% weight ratio is the maximum soluble amount of $CO_2$. Up to this amount, all the injected supercritical $CO_2$ is dissolved in the polymer. This dissolved supercritical $CO_2$ amount again affects the cell density of the extruded HIPS foam. The results shown in FIG. 11 predict that the amount of the supercritical $CO_2$ required for microcell nucleation in this case is 6.5% by weight.

Figure 12:
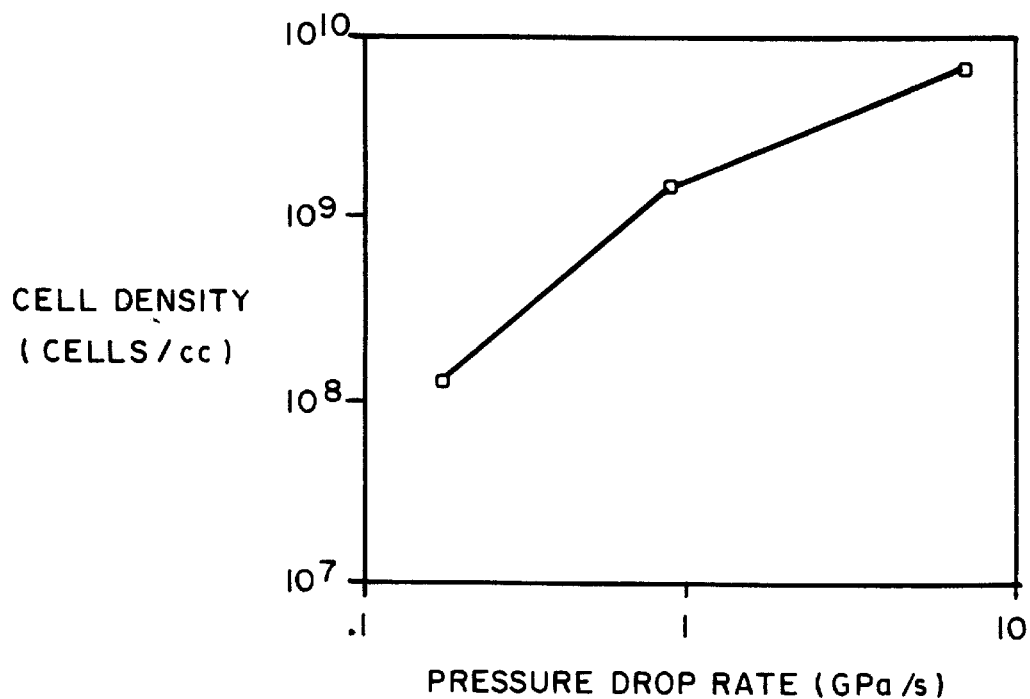
FIG. 12 shows a graph of the effect of the pressure drop rate on the cell density of an exemplary extruded material in accordance with the invention.

The effect of the pressure drop rate on the cell density was also investigated. The same amount of supercritical fluid, 10% (by weight) $CO_2$, was injected to form identical polymer/supercritical fluid solutions. When the pressure drop rates were 0.18 GPa/s ($2.6\times10^4$ psi/s), 0.90 GPa/s ($1.3\times10^5$ psi/s), and 6.9 GPa/s ($1.0\times10^6$ psi/s), the cell densities were $1\times10^8$ cells/cm$^3$, $1\times10^9$ cells/cm$^3$, and $7\times10^9$ cells/cm$^3$, respectively. The cell densities are plotted as a function of the pressure drop rate in FIG. 12.

While the above embodiments represent preferred embodiments of the invention, modifications thereof may occur to those in the art within the spirit and scope of the invention. Hence, the invention is not to be construed as limited to the particular embodiments disclosed except as defined by the appended claims.

What is claimed is:

1. A method comprising:
   providing a material to be foamed;
   mixing a supercritical carbon dioxide foaming agent into said material to create a mixture;
   creating a homogeneous single-phase solution from the mixture having a uniform concentration of foaming agent distributed therein and maintaining said single-phase solution at a pressure of at least about 1530 psi;
   nucleating the homogeneous single-phase solution by passing the single-phase solution through a constriction creating a rapid pressure drop in the single-phase solution at a pressure drop rate of at least about 0.18 GPa/s (26,100 psi/s) due to friction, to create a nucleated stream;
   shaping the nucleated stream essentially immediately after nucleating the solution to create a shaped microcellular extrudate; and
   releasing the shaped microcellular extrudate into ambient conditions essentially immediately after shaping.

2. The method of claim 1, further comprising mixing a metered amount of said foaming agent into said material.

3. The method of claim 2, comprising mixing a metered amount of said foaming agent into said material to be foamed while heating said material.

4. The method of claim 1 further comprising subjecting said single-phase solution to a decrease in temperature while subjecting said single-phase solution to a further pressure drop.

5. The method of claim 1 wherein said concentration of foaming agent in said single-phase solution is at least 1 wt %.

6. The method of claim 1 wherein said concentration of foaming agent in said single-phase solution is at least 5 wt %.

7. The method of claim 6 wherein said concentration of foaming agent in said single-phase solution is at least 10 wt %.

8. The method of claim 1 further comprising providing at least one nucleating agent in said single-phase solution.

9. The method of claim 1 comprising creating said single-phase solution in less than about 80 seconds.

10. The method of claim 1 further comprising subjecting said single-phase solution to an increase in temperature while subjecting said single-phase solution to a further pressure drop.

11. The method of claim 1 comprising subjecting said single-phase solution to a pressure drop at a rate of at least about 0.9 GPa/s (130,500 psi/s).

12. The method of claim 1 comprising subjecting said single-phase solution to a pressure drop at a rate of at least about 6.9 GPa/s (1,000,500 psi/s).

13. The method of claim 1 wherein the single-phase solution is essentially free of auxiliary nucleating agent.

14. The method of claim 1 comprising creating said single-phase solution by allowing convective diffusion of molecules of said foaming agent in said material to be foamed, thereby substantially completely diffusing and dissolving said foaming agent in said material.

15. The method of claim 1 further comprising subjecting said single-phase solution to an increase in temperature while subjecting said single-phase solution to said rapid pressure drop.

16. The method as in claim 1, further comprising maintaining said single-phase solution at a pressure of at least about 2700 psi.

17. The method as in claim 1, further comprising maintaining said single-phase solution at a pressure of at least about 3200 psi.

18. The method as in claim 1, further comprising maintaining said single-phase solution at a pressure of at least about 4000 psi.

19. The method of claim 1, wherein the material to be foamed is a semicrystalline polymeric material.

20. A method for forming foamed material comprising mixing together a supercritical carbon dioxide foaming agent and a material to be foamed, forming a single-phase solution of said foaming agent and said material to be foamed, maintaining said single-phase solution at a pressure greater than a solubility pressure of said foaming agent in said material to be foamed at a pressure of at least about 1530 psi, subjecting said single-phase solution to a pressure drop at a pressure drop rate of at least about 0.18 GPa/s (26,100 psi/s) to form sites of nucleation therein by passing said single-phase solution through a constriction causing friction in the solution, expanding said sites of nucleation to form cells, and causing said solution having cells therein to take the shape of a continuous extrusion of microcellular material having a cell density of at least $10^7$ sites/cm$^3$.

21. A method as in claim 20 comprising maintaining said single-phase solution at a pressure of at least 4000 psi.

22. The method of claim 21 wherein said material to be foamed is an amorphous polymer.

23. The method of claim 22 wherein said material to be foamed is a semicrystalline polymer.

24. A method as in claim 20 comprising forming said single-phase solution in less than about 80 seconds by allowing convective diffusion of said foaming agent in said material to be foamed.

25. A method as in claim 20 comprising forming microcellular foamed material having a cell density of at least $10^8$ cells per cubic centimeter.

26. A method as in claim 20 comprising forming microcellular foamed material having a cell density of at least $10^9$ cells per cubic centimeter.

27. The method of claim 20, wherein the material to be foamed is a semicrystalline polymeric material.

* * * * *